(12) United States Patent
Wood (10) Patent No.: US 10,175,420 B2
(45) Date of Patent: Jan. 8, 2019

(54) RAMAN-ENHANCED TRANSMISSION FIBER

(71) Applicant: Corning Incorporated, Corning, NY (US)

(72) Inventor: William Allen Wood, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/355,790

(22) Filed: Nov. 18, 2016

(65) Prior Publication Data

US 2017/0146733 A1    May 25, 2017

Related U.S. Application Data

(60) Provisional application No. 62/259,101, filed on Nov. 24, 2015.

(51) Int. Cl.
*G02B 6/036* (2006.01)
*G02B 6/02* (2006.01)
(Continued)

(52) U.S. Cl.
CPC ..... *G02B 6/03627* (2013.01); *G02B 6/02014* (2013.01); *G02B 6/02019* (2013.01);
(Continued)

(58) Field of Classification Search
None
See application file for complete search history.

(56) References Cited

U.S. PATENT DOCUMENTS 4,715,679 A   12/1987   Bhagavatula
4,889,404 A   12/1989   Bhagavatula et al.
(Continued)

FOREIGN PATENT DOCUMENTS

KR    2012030725 A    3/2012
WO    2011094400 A2   8/2011

OTHER PUBLICATIONS

Sakamoto, "Differential Mode Delay Managed Transmission Line for Wide-band WDM-MIMO System," OFC/NFOEC Technical Digest, 2012 OSA.
(Continued)

*Primary Examiner* — Tina M Wong
(74) *Attorney, Agent, or Firm* — Smit Kapadia; Svetlana Z. Short (57) ABSTRACT

According to some embodiments an optical fiber comprising: (I) a silica based core having: an inner core region with maximum refractive index delta of the core, $\Delta_0$ in % measured relative to pure $SiO_2 \leq 0.1\%$, and an outer core region with a minimum refractive index delta $\Delta_1$, where $\Delta_1 < \Delta_0$; such that the fiber has: (i) an effective area $Aeff_{\lambda=1525}$ of $LP_{01}$ mode at a wavelength $\lambda=1525$ nm such that 80 $\mu m^2 < Aeff_{\lambda=1525} < 250$ $\mu m^2$; and (ii) an effective area $Aeff_{\lambda=1475}$ of $LP_{01}$ mode at wavelength $\lambda=1450$ nm such that 60 $\mu m^2 < Aeff_{\lambda=1475}$, wherein
$Aeff_{\lambda=1525} > Aeff_{\lambda=1475}$, and $(Aeff_{\lambda=1525} - Aeff_{\lambda=1475})/Aeff_{\lambda=1525} \geq 0.07$; and (II) an annular cladding surrounding the core, the cladding including: (i) a low index ring surrounding the core and having a minimum refractive index delta $\Delta_{R,MIN}$, where $\Delta_{R,MIN} \geq \Delta_1$; and (ii) an outer cladding with a refractive index delta $\Delta_{Outer-Clad}$ relative to pure silica, such that $\Delta_{Outer-Clad} > \Delta_{R,MIN}$.

25 Claims, 1 Drawing Sheet

(51) Int. Cl.
*H01S 3/30* (2006.01)
*H01S 3/067* (2006.01)

(52) U.S. Cl.
CPC ........... *H01S 3/302* (2013.01); *H01S 3/06729* (2013.01); *H01S 3/06733* (2013.01)

(56) References Cited

U.S. PATENT DOCUMENTS

| | | | |
|---|---|---|---|
| 6,418,256 B1* | 7/2002 | Danziger | G02B 6/02023 |
| | | | 385/123 |
| 7,095,940 B2 | 8/2006 | Hayami et al. | |
| 7,426,327 B2 | 9/2008 | Mishra | |
| 7,483,612 B2 | 1/2009 | Digiovanni et al. | |
| 7,689,085 B1* | 3/2010 | Mishra | G02B 6/02019 |
| | | | 385/123 |
| 7,929,818 B1* | 4/2011 | Bickham | G02B 6/02019 |
| | | | 385/124 |
| 8,971,682 B2 | 3/2015 | Evans et al. | |
| 2002/0164140 A1 | 11/2002 | Lysiansky et al. | |
| 2010/0103978 A1 | 4/2010 | Lee et al. | |
| 2011/0018826 A1 | 1/2011 | Shoji | |
| 2012/0106909 A1 | 5/2012 | Bickham et al. | |
| 2013/0230290 A1 | 9/2013 | Evans et al. | |
| 2017/0146733 A1* | 5/2017 | Wood | G02B 6/03627 |
| 2017/0219769 A1 | 8/2017 | Wood | |

OTHER PUBLICATIONS

T.A. Lenahan, "Calculation of modes in an optical fiber using a finite element method and EISPACK," Bell Syst. Tech. J., 62(1), p. 2663-2694, Feb. 1983.

Jeunhomme, "Single Mode Fiber Optics:Principles and Applications", pp. 39-44, Marcel Dekker, New York, 1990.

* cited by examiner

RAMAN-ENHANCED TRANSMISSION FIBER

This application claims the benefit of priority under 35 U.S.C. § 119 of U.S. Provisional Application Ser. No. 62/259,101 filed Nov. 24, 2015 on the content of which is relied upon and incorporated herein by reference in its entirety.

BACKGROUND

The disclosure relates generally optical fibers and, more specifically, to large effective area, optical fibers with low attenuation which may be used in Raman-amplified transmission system applications.

The explosive growth in the volume and variety of multi-media telecommunication applications continues to drive speed demands for internet traffic and motivate research in long-haul fiber-optic telecommunication.

Modern high-data-rate coherent transmission systems are already approaching information capacity limits. To exploit the remaining capacity in optical fiber, advanced multi-level modulation formats, such as QAM, and/or superchannel or OFDM systems will be needed. However these systems require higher signal-to-noise ratios (SNR) than are currently feasible. Fiber nonlinearities and fiber attenuation are the key performance limitations that prevent the higher SNRS from being achieved.

Raman based fiber amplification depends on a nonlinear optical effect, but there is a tradeoff between fiber's effective area, loss, and Raman pump power. As the fiber effective area increases, deleterious nonlinear distortions decrease, but the Raman gain drops, making it difficult to achieve the desired high power signal levels.

No admission is made that any reference cited herein constitutes prior art. Applicant expressly reserves the right to challenge the accuracy and pertinence of any cited documents.

SUMMARY

Some of the embodiments of the disclosure relate to an optical fiber comprising:
(I) a silica based core having:
   (i) an inner core region with maximum refractive index delta of the core, $\Delta_0$ in % measured relative to pure $SiO_2 \leq 0.1\%$, and
   (ii) an outer core region with a minimum refractive index delta $\Delta_1$, where $\Delta_1 < \Delta_0$; such that the fiber has
      (a) an effective area $Aeff_{\lambda=1525}$ of $LP_{01}$ mode at a wavelength $\lambda=1525$ nm such that 80 $\mu m^2 < Aeff_{\lambda=1525} < 250 \mu m^2$; and
      (b) an effective area $Aeff_{\lambda=1475}$ of $LP_{01}$ mode at wavelength $\lambda=1450$ nm such that 65 $\mu m^2 < Aeff_{\lambda=1475}$, wherein
$Aeff_{\lambda=1525} > Aeff_{\lambda=1475}$, and $(Aeff_{\lambda=1525} - Aeff_{\lambda=1475})/Aeff_{\lambda=1525} \geq 0.07$; and
(II) an annular cladding surrounding the core, the cladding including
   (i) a low index ring surrounding core and having a minimum refractive index delta $\Delta_{RMIN}$, where $\Delta_{R,MIN} < \Delta_1$; and
   (ii) an outer cladding with a refractive index delta $\Delta_{Outer-Clad}$ relative to pure silica, such that $\Delta_{Outer-Clad} > \Delta_{R,MIN}$.

According to some embodiments, $-0.02\% \leq \Delta_0 \leq 0.1\%$, and $-0.25 \leq \Delta_1 < -0.08$; and $\Delta_{RMIN} \leq -0.30$, measured relative to pure $SiO_2$. According to some embodiments, the core is a Ge free core, and the absolute difference between the relative refractive index of the core $\Delta_0$ and the outer cladding $\Delta_{Outer-Clad}$ is: $|\Delta_0 - \Delta_{Outer-Clad}| > 0.05\%$. According to some embodiments the core comprises silica, silica doped with chlorine (Cl), or silica doped with an alkali. According to some embodiments, 75 $\mu m^2 < Aeff_{\lambda=1475} < 150 \mu m^2$, for example 75 $\mu m^2 < Aeff_{\lambda=1475} < 140 \mu m^2$. According to some embodiments, 80 $\mu m^2 < Aeff_{\lambda=1525} < 200 \mu m^2$, for example 80 $\mu m^2 < Aeff_{\lambda=1525} < 160 \mu m^2$. According to some embodiments, $0.07 \leq (Aeff_{\lambda=1525} - Aeff_{\lambda=1475})/Aeff_{\lambda=1525} \leq 0.15$, for example $0.09 \leq (Aeff_{\lambda=1525} - Aeff_{\lambda=1475})/Aeff_{\lambda=1525} \leq 0.15$.

According to some embodiments the inner core region and the outer core region have the refractive indices $\Delta_0$, $\Delta_1$ and outer radii such that the fiber has
   (i) an effective area $Aeff_{\lambda=1550}$ of $LP_{01}$ mode at a wavelength $\lambda=1550$ nm, and 80 $\mu m^2 < Aeff_{\lambda=1550} < 250 \mu m^2$; and
   (ii) an effective area $Aeff_{\lambda=1450}$ of $LP_{01}$ mode at wavelength $\lambda=1450$ nm, and 65 $\mu m^2 < Aeff_{\lambda=1450} < 225 \mu m^2$ (e.g., 65 $\mu m^2 < Aeff_{\lambda=1450} < 145 \mu m^2$), and
   (iii) $Aeff_{\lambda=1550} > Aeff_{\lambda=1450}$, and $(Aeff_{\lambda=1550} - Aeff_{\lambda=1450})/Aeff_{\lambda=1550} \geq 0.1$.

Some of the embodiments of the disclosure relate to an optical fiber comprising:
(I) a Ge-free silica based core including:
   (i) an inner core region with maximum refractive index delta of the core, $\Delta_0$ in % measured relative to pure $SiO_2$ such that $-0.02\% \leq \Delta_0 \leq 0.1\%$, and
   (ii) an outer core region with a minimum refractive index delta $\Delta_1$, where $-0.25 \leq \Delta_1 < -0.08$; such that the fiber has
      (a) an effective area $Aeff_{\lambda=1550}$ of $LP_{01}$ mode at a wavelength $\lambda=1550$ nm such that 80 $\mu m^2 < Aeff_{\lambda=1550} < 250 \mu m^2$; and
      (b) an effective area $Aeff_{\lambda=1450}$ of $LP_{01}$ mode at wavelength $\lambda=1450$ nm such that 65 $\mu m^2 < Aeff_{\lambda=1450} < 225 \mu m^2$ (for example, 70 $\mu m^2 < Aeff_{\lambda=1450} < 215 \mu m^2$, or 65 $\mu m^2 < Aeff_{\lambda=1450} < 140 \mu m^2$), wherein
$Aeff_{\lambda=1550} > Aeff_{\lambda=1450}$, and $(Aeff_{\lambda=1550} - Aeff_{\lambda=1450})/Aeff_{\lambda=1550} \geq 0.1$; and
(II) an annular cladding surrounding the core, the cladding including
   (i) a low index ring surrounding the core and having a minimum refractive index delta $\Delta_{RMIN}$, where (a) $\Delta_{R,MIN} < \Delta_1$ and (b) $\Delta_{RMIN} \leq -0.3$ measured relative to pure $SiO_2$; and
   (ii) an outer cladding with a refractive index delta $\Delta_{Outer-Clad}$ relative to pure silica, such that $\Delta_{Outer-Clad} > \Delta_{R,MIN}$.

For example, in some embodiments $0.1 \leq (Aeff_{\lambda=1550} - Aeff_{\lambda=1450})/Aeff_{\lambda=1550} \leq 0.28$, or for example $0.10 \leq (Aeff_{\lambda=1550} - Aeff_{\lambda=1450})/Aeff_{\lambda=1550} \leq 0.25$. In some embodiments 70 $\mu m^2 < Aeff_{\lambda=1450} < 215 \mu m^2$. In some embodiments 70 $\mu m^2 < Aeff_{\lambda=1450} < 135 \mu m^2$, $\Delta_{RMIN} \leq -0.35$, and the absolute difference between the relative refractive index of the core $\Delta_0$ and the outer cladding $\Delta_{Outer-Clad}$ is: $|\Delta_0 - \Delta_{Outer-Clad}| > 0.05\%$.

Some of the embodiments of the disclosure relate to an optical fiber comprising:
(I) a Ge-free silica based core having a refractive index delta $\Delta_0$ alpha value $(\alpha) \geq 5$, the core comprising:
   (i) an inner core region with maximum refractive index delta of the core, $\Delta_0$ in % measured relative to pure $SiO_2$ such that $-0.02\% \leq \Delta_0 \leq 0.1\%$, and
   (ii) an outer core region with a minimum refractive index delta $\Delta_1$, where $-0.25 \leq \Delta_1 < -0.08$; such that the fiber has
      (a) an effective area $Aeff,s$ of $LP_{01}$ mode such that for a wavelength $\lambda s$, 80 $\mu m^2 < Aeff,s < 250 \mu m^2$ where the wavelength $\lambda s$ is 1610 nm > $\lambda s$ > 1525 nm, and (b) an effective area Aeff,p of $LP_{01}$ mode such that at a wavelength $\lambda p$ 65 $\mu m^2$<Aeff,p<225 $\mu m^2$ (e.g., 65 $\mu m^2$<Aeff,p<160 $\mu m^2$, or 65 $\mu m^2$<Aeff,p<150 $\mu m^2$), and the wavelength $\lambda p$ is 1510 nm>$\mu p$>1420 nm wherein 50 nm≤$\lambda s$–$\lambda p$<125 nm, and (c) (Aeff,s–Aeff,p)/Aeff,s is at least 0.12; where 80 nm<($\lambda s'$–$\lambda p'$)<110 nm and (II) an annular cladding surrounding the core, the cladding including: (i) a low index ring surrounding the core and having a minimum refractive index delta $\Delta_{R,MIN}$<$\Delta_1$, and $\Delta_{R,MIN}$≤–0.30 measured relative to pure $SiO_2$; and (iii) an outer cladding with a refractive index delta $\Delta_{Outer-Clad}$ relative to pure silica, such that $\Delta_{Outer-Clad}$>$\Delta_{R,MIN}$.

In some embodiments the core has an alpha value ($\alpha$) is ≥6, $\alpha$ is ≥8, and in some embodiments ($\alpha$) is 6≥$\alpha$≥25, for example ≥12. In some embodiments $\Delta_{RMIN}$≤–0.35, relative to pure $SiO_2$; and |$\Delta_0$–$\Delta_{Outer-Clad}$|>0.05%.

In some embodiments (Aeff,s–Aeff,p)/Aeff,s is at least 0.13, for example 0.14 or higher. In some embodiments 0.12≤(Aeff,s–Aeff,p)/Aeff,s≤0.3, for example 0.13≤(Aeff,s–Aeff,p)/Aeff,s≤0.3. In some embodiments 80 $\mu m^2$<Aeff,s<200 $\mu m^2$. For example, at least in some embodiments 80 $\mu m^2$<Aeff,s<170 $\mu m^2$, and 65 $\mu m^2$<Aeff,p<140 $\mu m^2$. In some embodiments 80 $\mu m^2$<Aeff,s<160 $\mu m^2$, and 75 $\mu m^2$<Aeff,p<140 $\mu m^2$.

In some embodiments 80 nm<$\lambda s$–$\lambda p$<110 nm and 0.11≤(Aeff,s–Aeff,p)/Aeff,s≤0.30.

In some embodiments 80 nm<$\lambda s$–$\lambda p$<110 nm and 0.12≤(Aeff,s–Aeff,p)/Aeff,s≤0.30.

In some embodiments 80 nm<$\lambda s$–$\lambda p$<110 nm and 0.13≤(Aeff,s–Aeff,p)/Aeff,s≤0.30.

Some of the embodiments of the disclosure relate to an optical fiber comprising an inner region and an outer core region that have the refractive indices and outer radii such that fiber has:

(i) an effective area Aeff,s of $LP_{01}$ mode such that at a wavelength $\lambda s$, 80 $\mu m^2$<Aeff,s<160 $\mu m^2$ where 1565 nm>$\lambda s$>1525 nm; and (ii) an effective area Aeff,p of $LP_{01}$ mode such that at a wavelength $\lambda p$, 75 $\mu m^2$<Aeff,p<140 $\mu m^2$ and 50 nm<($\lambda s$–$\lambda p$)<125 nm; and wherein (Aeff,s–Aeff,p)/Aeff,s≥0.12 (for example, 0.13≤(Aeff,s–Aeff,p)/Aeff,s≤0.30). In some of these embodiments 80 nm<$\lambda s$–$\lambda p$<110 nm, and 0.11≤(Aeff,s–Aeff,p)/Aeff,s≤0.30.

Some of the embodiments of the disclosure relate to an optical fiber comprising: Ge-free core and wherein said inner region and said outer core region have the refractive indices and outer radii such that fiber has (i) 80 $\mu m^2$<$Aeff_{1550}$<200 $\mu m^2$; and
(ii) 60 $\mu m^2$<$Aeff_{1450}$<180 $\mu m^2$, and $Aeff_{1450}$<$Aeff_{1550}$; and
(iii) for all wavelengths $\lambda s'$ and $\lambda p'$ where 80nm<($\lambda s'$–$\lambda p'$)<110 nm, and where $\lambda s'$ is situated in the 1525 nm to 1610 nm wavelength range and $\lambda p'$ is situated in the 1420 nm to 1510 nm range, and the effective areas Aeff,s' of $LP_{01}$ mode and at wavelengths $\lambda s'$ and the effective areas Aeff,p' at the wavelengths $\lambda p'$ are such that (Aeff,s'–Aeff,p')/Aeff,s'>0.11 where 80 nm<($\lambda s'$–$\lambda p'$)<110 nm.

In some embodiments Aeff,s'>Aeff,p' and 0.3≥(Aeff,s'–Aeff,p')/Aeff,s'≥0.11. In some of these embodiments 50 nm<$\lambda s'$–$\lambda p'$<125 nm and 0.12≤(Aeff,s'–Aeff,p')/Aeff,s'≤0.30. In at least some embodiments 80 nm <$\lambda s'$–$\lambda p'$<110 nm, and 0.12≤(Aeff,s'–Aeff,p')/Aeff,s≤0.30.

Some of the embodiments of the disclosure relate to an optical fiber comprising:

(I) a silica based core having a refractive index delta $\Delta_0$ and alpha value $\alpha$≥5, the core comprising an outer an inner core region with a refractive index delta $\Delta_0$ and an outer core region with a refractive index delta $\Delta_1$<$\Delta_0$, such that the fiber has:

(i) an effective area Aeff,s of $LP_{01}$ mode such that for a wavelength $\lambda s$, 75 $\mu m^2$<Aeff,s<250 $\mu m^2$ where the wavelength $\lambda s$ is 1610 nm>$\lambda s$>1525 nm, and (ii) an effective area Aeff,p of $LP_{01}$ mode such that at a wavelength $\lambda p$ 60 $\mu m^2$<Aeff,p<225 $\mu m^2$, and the wavelength $\lambda p$ is 1510 nm>$\lambda p$>1420 nm, and (iii) (Aeff,s–Aeff,p)/Aeff,s is at least 0.12 (for example 0.12 to 0.3); and (II) an annular cladding surrounding the core, the cladding comprising: (i) a low index ring surrounding the core and having a minimum refractive index delta $\Delta_{R,MIN}$<$\Delta_1$, and $\Delta_{R,MIN}$≤–0.30 measured relative to pure $SiO_2$, and (ii) an outer cladding with a refractive index delta $\Delta_{Outer-Clad}$ relative to pure silica, such that $\Delta_{Outer-Clad}$>$\Delta_{R,MIN}$.

According to some embodiments the core is a Ge-free core. According to at least some embodiments the maximum refractive index delta of the core, $\Delta_0$ in %, measured relative to pure $SiO_2$, is –0.02%≤$\Delta_0$≤0.1%; and –0.25≤$\Delta_1$<–0.08; $\Delta_{RMIN}$<$\Delta_1$, and $\Delta_{R,MIN}$≤–0.35, relative to pure silica.

According to at least some embodiments, the effective area Aeff,s at the wavelength $\lambda s$ is 75 $\mu m^2$<Aeff,s<200 $\mu m^2$, or 75 $\mu m^2$<Aeff,s<160 $\mu m^2$. According to at least some embodiments, 80 $\mu m^2$<Aeff,s<170 $\mu m^2$, and 65 $\mu m^2$<Aeff,p<160 $\mu m^2$.

According to at least some embodiments the core is a Ge-free core; and 80 $\mu m^2$<Aeff,s<150 $\mu m^2$ and 0.07≤(Aeff,s–Aeff,p)/Aeff,s≤0.30. For example, 0.12≤(Aeff,s–Aeff,p)/Aeff,s≤0.30, or 0.07≤(Aeff,s–Aeff,p)/Aeff,s≤0.15.

According to at least some embodiments the core is a Ge-free core; and 80 $\mu m^2$<Aeff,s<160 $\mu m^2$, 0.12≤(Aeff,s–Aeff,p)/Aeff,s≤0.30; and 50 nm<$\lambda s$–$\mu p$<125 nm; and in these embodiments $\Delta_{R,MIN}$<$\Delta_0$ and $\Delta_{R,MIN}$≤–0.35 measured relative to pure $SiO_2$; and (|$\Delta_0$–$\Delta_{Outer-Clad}$|>0.05%. For example, $\lambda s$–$\lambda p$ may be 120 nm, 115 nm, 110 nm, 105 nm, 100 nm, 95 nm, 90 nm, 80 nm, 75 nm, 60 nm, 55 nm, or therebetween. For example, in some embodiments 80 nm<$\lambda s$–$\lambda p$<120 nm, 1540 nm<$\lambda s$ <1560 nm, or 1440 nm<$\lambda p$<1460nm. In some embodiments 90 nm<$\lambda s$–$\lambda p$<110 nm, while 1540 nm<$\lambda s$<1560 nm and 1440 nm<$\lambda p$<1460 nm. In some embodiments 95 nm<$\lambda s$–$\lambda p$<105 nm, for example 98 nm<$\lambda s$–$\lambda p$<102 nm. In some of these embodiments 0.11≤(Aeff,s–Aeff,p)/Aeff,s≤0.30. In some embodiments 0.12≤(Aeff,s–Aeff,p)/Aeff,s≤0.30.

In some embodiments 0.12≤(Aeff,s–Aeff,p)/Aeff,s≤0.15. In some embodiments 0.07≤(Aeff,s–Aeff,p)/Aeff,s≤0.15.

Some of the embodiments of the disclosure relate to an optical fiber comprising:

(I) a silica based core comprising an inner core region with a refractive index delta $\Delta_0$ and an annular outer core region with a refractive index delta $\Delta_1$<$\Delta_0$ and –0.25≤$\Delta_1$<–0.08 surrounding the inner ore region, such that the fiber has:

(i) an effective area Aeff,s of $LP_{01}$ mode such that for a wavelength $\lambda s$, 80 $\mu m^2$<Aeff,s<160 $\mu m^2$ where 1610 nm>$\lambda s$>1525 nm, and (ii) an effective area Aeff,p of $LP_{01}$ mode at a wavelength $\lambda p$ is 75 $\mu m^2$<Aeff,p<140 $\mu m^2$, and 1510 nm>$\lambda p$>1420 nm, wherein 80 nm<($\lambda s'$–$\lambda p'$)<125 nm, (Aeff,s–Aeff,p)/Aeff,s is at least 0.13 (for example, 0.13 to 0.3, or 0.13 to 0.27, or 0.13 to 0.25); and (iii) maximum refractive index delta of the core, $\Delta_0$ in %, measured relative to pure $SiO_2$, wherein $-0.02\% \leq \Delta_0 \leq 0.1\%$; and (II) a low index ring surrounding the core and having a minimum refractive index delta $\Delta_{R,MIN}$, where (a) $\Delta_{R,MIN} < \Delta_0$ and (b) $\Delta_{R,MIN} \leq -0.35$ measured relative to pure $SiO_2$; and (iii) an outer cladding with a refractive index delta $\Delta_{Outer\text{-}Clad}$ relative to pure silica, such that $\Delta_{Outer\text{-}Clad} > \Delta_{RMIN}$; and the absolute difference between the relative refractive index of the core $\Delta_0$ and the outer cladding $\Delta_{Outer\text{-}Clad}$ is $|\Delta_0 - \Delta_{Outer\text{-}Clad}| > 0.05\%$.

According to at least some embodiments the core is a Ge-free core. According to some exemplary embodiments $0.15 \geq (Aeff,s - Aeff,p)/Aeff,s \geq 0.08$. According to some embodiments $0.30 \geq (Aeff,s - Aeff,p)/Aeff,s \geq 0.09$, and $75$ nm $< (\lambda s - \lambda p) < 120$ nm. According to some embodiments $0.30 \geq (Aeff,s - Aeff,p)/Aeff,s \geq 0.1$, and $80$ nm $< (\lambda s - \lambda p) < 110$ nm.

According to at least one embodiment an optical fiber includes a Ge-free silica based core comprising an inner core region with a refractive index delta $\Delta_0$ (in %, measured relative to pure $SiO_2$) and an outer core region with a refractive index delta $\Delta_1$ (in %, measured relative to pure $SiO_2$) such that $\Delta_1 < \Delta_0$, and such that the fiber has:
(i) an effective area Aeff,s of $LP_{01}$ mode such that for the wavelength of 1550 nm, $80 \ \mu m^2 < Aeff_{1550} < 200 \ \mu m^2$; and
(ii) an effective area Aeff,p of $LP_{01}$ mode such that for the wavelength of 1450 nm, $75 \ \mu m^2 < Aeff_{1450} < 180 \ \mu m^2$, and $Aeff_{1450} < Aeff_{1550}$; and
(iii) for all wavelengths $\lambda s'$ and $\lambda p'$ where $80$ nm $< (\lambda s' - \lambda p') < 110$ nm, where $\lambda s'$ are situated in the 1525 nm to 1610 nm wavelength range and $\lambda p'$ are situated in the 1420 nm to 1510 nm wavelength range: the effective areas Aeff,s' of $LP_{01}$ mode and at the wavelengths $\lambda s'$ and the effective areas Aeff,p' at the wavelengths $\lambda p'$ are such that $(Aeff,s' - Aeff,p')/Aeff,s' \geq 0.11$ (e.g., $>0.12$, or even $>0.13$).

For example, in some embodiments $80$ nm $< (\lambda s' - \lambda p') < 110$ nm and $0.3 \geq (Aeff,s' - Aeff,p')/Aeff,s' \geq 0.11$, or $0.3 \geq (Aeff,s' - Aeff,p')/Aeff,s' \geq 0.13$, or $0.3 \geq (Aeff,s' - Aeff,p')/Aeff,s' \geq 0.15$. For example, in some embodiments, $0.3 \geq (Aeff,s' - Aeff,p')/Aeff,s' \geq 0.18$, or o $0.27 \geq (Aeff,s' - Aeff,p')/Aeff,s' \geq 0.18$.

One embodiment of the disclosure relates to an optical fiber that comprises:
I. a Ge-free silica based core comprising an inner core region surrounded by an outer core region wherein (i) the inner core region has a maximum refractive index delta of the inner core region, $\Delta_0$ in % measured relative to pure $SiO_2$ such that $-0.02\% \leq \Delta_0 \leq 0.1\%$, and (ii) the outer core region has a minimum refractive index delta $\Delta_1$, such that $-0.25 \leq \Delta_1 < -0.08$, and the fiber has: (iii) an effective area Aeff,s of $LP_{01}$ mode such that for a wavelength $\lambda s = 1550$ nm, $80 \ \mu m^2 < Aeff,s < 150 \ \mu m^2$ and (ii) an effective area Aeff,p of $LP_{01}$ mode such that for a wavelength $\lambda p = 1450$ nm, $75 \ \mu m^2 < Aeff,p < 140 \ \mu m^2$, and for all wavelengths $\lambda s'$ and $\lambda p'$ where $80$ nm $< (\lambda s' - \lambda p') < 110$ nm, and $\lambda s'$ are situated in the 1525 nm to 1610 nm wavelength range and $\lambda p'$ are situated in the 1420 nm to 1510 nm range, the effective area Aeff,s' of $LP_{01}$ mode and the effective area Aeff,p' is such that $(Aeff,s' - Aeff,p')/Aeff,s' \geq 0.11$ (or, for example, $\geq 0.13$, or even $\geq 0.15$); and II. an annular cladding surrounding the core, the cladding including: (i) a) a low index ring surrounding the core and having a minimum refractive index delta $\Delta_{RMIN}$, where (a) $\Delta_{RMIN} < \Delta_1$, and (b) $\Delta_{RMIN} \leq -0.35$ relative to pure $SiO_2$, and (ii) an outer cladding with a refractive index delta $\Delta_{Outer\text{-}Clad}$ relative to pure silica, such that $\Delta_{Outer\text{-}Clad} > \Delta_{RMIN}$; and the difference between the relative refractive index of the core $4_0$ and the outer cladding $\Delta_{Outer\text{-}Clad}$ is: $|\Delta_0 - \Delta_{Outer\text{-}Clad}| > 0.05\%$. In some embodiments the core's alpha value ($\alpha$) is $\geq 5$, for example $\alpha \geq 6$, or $\alpha \geq 10$, (e.g., $25 \geq \alpha \geq 5$ or $25 \geq \alpha \geq 6$).

One embodiment of the disclosure relates to an optical fiber comprising:
(I) a silica based core comprising (a) an outer an inner core region with a refractive index delta $\Delta_0$ wherein $-0.02\% \leq \Delta_0 \leq 0.1\%$ and an outer radius $R_1$, and (b) an outer core region with an outer radius $R_2$, and a refractive index delta $\Delta_1$ such that $\Delta_1 < \Delta_0$ wherein $0.25 \leq \Delta_1 < -0.08$, such that the fiber has:
(i) an effective area $Aeff,_{\lambda=1550}$ of $LP_{01}$ mode at a wavelength $\lambda = 1550$ nm such that $80 \ \mu m^2 < Aeff,_{\lambda=1550} < 200 \ \mu m^2$; and
(ii) an effective area $Aeff,_{\lambda=1450}$ of $LP_{01}$ mode at a wavelength $\lambda = 1450$ nm such that $60 \ \mu m^2 < Aeff,_{\lambda=1450} < 135 \ \mu m^2$ (e.g., $65 \ \mu m^2 < Aeff,_{\lambda=1450} < 130 \ \mu m^2$) wherein $(Aeff,_{\lambda=1550} - Aeff,_{\lambda=1450}/Aeff,_{\lambda=1550}$ is at least 0.1 (e.g., 0.1-0.25); and (II) an annular cladding surrounding the core, said cladding including
(i) a low index ring surrounding the inner core and having a minimum refractive index delta $\Delta_{R,MIN}$, where $\Delta_{RMIN} < \Delta_1$ and (b) $\Delta_{R,MIN} \leq -0.35$ measured relative to pure $SiO_2$, and
(ii) an outer cladding with a refractive index delta $\Delta_{Outer\text{-}Clad}$ relative to pure silica, such that $\Delta_{Outer\text{-}Clad} > \Delta_{R,MIN}$; and the absolute difference between the relative refractive index of the core $\Delta_0$ and the outer cladding $\Delta_{Outer\text{-}Clad}$ is $$|\Delta_0 - \Delta_{Outer\text{-}Clad}| > 0.05\%.$$

According to at least some embodiments the fiber core is a Ge-free silica based core and the fiber has a step index profile, the core having alpha value is greater than or equal to 5. In some embodiments the core's alpha value ($\alpha$) is $\geq 8$, for example $\alpha \geq 10$, or $\alpha \geq 12$.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Reference will now be made in detail to embodiments of optical fibers for use as long haul transmission fibers, examples of which are illustrated in the accompanying drawings. Whenever possible, the same reference numerals are used throughout the drawings to refer to the same or like parts.

Terminology

The following terminology will be used herein to describe the optical fibers, with some of the parameters being introduced and defined below in connection with the various example embodiments:

The term "refractive index profile," as used herein, is the relationship between the refractive index or the relative refractive index and the radius of the fiber.

The term "relative refractive index," also referred to as "refractive index delta", or as to "index delta", as used herein, is defined as:

$$\Delta(r)=[n(r)^2-n_{REF}^2)]/2n_{REF}^2,$$

where n(r) is the refractive index at radius r, unless otherwise specified. The relative refractive index is defined at 1550 nm unless otherwise specified. The reference index $n_{REF}$ is pure silica glass, the relative refractive index is represented by $\Delta$ and its values are given in units of "%", unless otherwise specified. In cases where the refractive index of a region is less than the reference index $n_{REF}$, the relative index percent is negative and is referred to as having a depressed region or depressed-index, and the minimum relative refractive index is calculated at the point at which the relative index is most negative unless otherwise specified. In cases where the refractive index of a region is greater than the reference index $n_{REF}$, the relative index percent is positive and the region can be said to be raised or to have a positive index.

The term "downdopant," as used herein, is a dopant which has a propensity to lower the refractive index of glass relative to pure, undoped $SiO_2$. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

As used herein, the "effective area" $A_{eff}$ of an optical fiber is the area of the optical fiber in which light is propagated and is defined as:

$$A_{eff} = 2\pi \frac{\left(\int_0^\infty E^2 r\, dr\right)^2}{\int_0^\infty E^4 r\, dr},$$

where E is the electric field associated with light propagated in the fiber and r is the radius of the fiber. In the examples described herein, The effective area at the signal wavelength, of Aeff,s is determined at a wavelength of 1550 nm, unless otherwise specified.

The cutoff wavelength of a mode is the minimum wavelength beyond which a mode ceases to propagate in the optical fiber. The cutoff wavelength of a single mode fiber is the minimum wavelength at which an optical fiber will support only one propagating mode. The cutoff wavelength of a single mode fiber corresponds to the highest cutoff wavelength among the higher order modes. Typically the highest cutoff wavelength corresponds to the cutoff wavelength of the $LP_{11}$ mode. A mathematical definition of a theoretical cutoff wavelength is given in Single Mode Fiber Optics, Jeunhomme, pp. 39 44, Marcel Dekker, New York, 1990, wherein the theoretical fiber cutoff is described as the wavelength at which the mode propagation constant becomes equal to the plane wave propagation constant in the outer cladding.

As used herein, the term "few moded fiber" refers to a fiber supporting the propagation of more than a single mode fiber but fewer modes than a normal multimode fiber (i.e., not greater than 20 LP modes). The number of propagating modes and their characteristics in a cylindrically symmetric optical fiber with an arbitrary refractive index profile is obtained by solving the scalar wave equation (see for example T. A. Lenahan, "Calculation of modes in an optical fiber using a finite element method and EISPACK," Bell Syst. Tech. J., vol. 62, no. 1, p. 2663, February 1983). In some of the embodiments disclosed herein the optical fiber is a single mode fiber. In some embodiments it is a quasi-single mode fiber—i.e., it has less than 5 optical modes, for example only two modes—$LP_{01}$ and $LP_{11}$, or only 4 modes—$LP_{01}$, $LP_{11}$, $LP_{21}$, $LP_{02}$.

The bend resistance or bend performance of an optical fiber may be measured by the induced attenuation of light propagating through the fiber under prescribed test conditions. The bend performance of the optical fibers described herein is determined using the pin array bend test to compare the relative resistance of the optical fibers to bending. To perform this test, attenuation is measured for an optical fiber with essentially no induced bending loss. The optical fiber is then woven about the pin array and the attenuation is once again measured. The loss induced by bending, typically expressed in units of dB, is the difference between the two attenuation measurements. The pin array is a set of ten cylindrical pins arranged in a single row and held in a fixed vertical position on a flat surface. The pin spacing is 5 mm, center to center. The pin diameter is 0.67 mm. The optical fiber is caused to pass on opposite sides of adjacent pins. During testing, the optical fiber is placed under a tension sufficient to make the optical fiber conform to the portion of the periphery of the pins contacted by the fiber. The test pertains to macro-bend resistance of the optical fiber.

The term "α-profile" or "alpha profile," as used herein, refers to a relative refractive index profile, expressed in terms of $\Delta$ which is in units of "%", where r is the radius and which follows the equation, $$\Delta = \Delta_0 \left[1 - \left(\frac{r}{R_1}\right)^\alpha\right],$$

where $\Delta_0$ is the maximum relative refractive index, $R_1$ is the radius of the core, r is in the range $r_i \leq r \leq r_f$, $\Delta$ is as defined above, $r_i$ is the initial point of the α-profile, $r_f$ is the final point of the α-profile, and α is a real number exponent. As defined herein, for a graded index profile, the alpha value is less than $1.8 < \alpha < 2.3$, and a step index profile has an alpha value that is at least 5. The fiber embodiments described herein have step index profiles with α>5, for example α>6, or α>8, or even α≥10.

Unless otherwise specified herein, the above-referenced properties of the optical fiber disclosed herein and discussed below are measured or modeled at a signal wavelength of 1550 nm.

Because of its intrinsically superior noise performance, Raman amplification is likely to remain an important component in next-generation terrestrial systems.

Because Raman-based fiber amplification depends on a nonlinear optical effect, there is a tradeoff between fiber effective area (Aeff (at a signal wavelength)), fiber attenuation α (intrinsic fiber loss), and Raman pump power. In typical fibers used in Raman systems, as the effective area of the optical fiber increases, deleterious nonlinear distortions decrease (enabling increased signal-to-noise ratios), but the Raman gain drops and more Raman pump power is required to compensate for that (i.e., to keep the gain constant).

Our simulations have shown that if the Raman pump power can be increased without limit to maintain constant gain as the effective area Aeff (at a signal wavelength) of the fiber increases, the system performance also will increase. However, it is well known to the one of skill in the art that Raman pump power can not be increased without a limit to maintain constant gain. Additionally, the higher the fiber loss, the more pump power is required to maintain link transparency. At some point, practical limits on available Raman pump power limit the extent to which effective area can be usefully increased (i.e., it is no longer possible to provide the required gain). Thus, one of skill in the art understands that in typical commercial fibers, the larger the fiber loss, the less improvement one can obtain by increasing its effective area.

However, we realized that Raman pump power can be increased if the effective area of the fiber at a signal wavelength and that the effective area of the fiber at the pump wavelength relative to one another, satisfy one or more relationship(s) described herein. More specifically, we reduced the effective area of the fiber at a $\lambda p$ (e.g., 1450 nm pump wavelength) relative to the effective area at the wavelength $\lambda s$ (e.g., 1550 nm signal wavelength).

The Raman gain in an optical fiber is proportional to $g_R/A_{sp}$ where the gain coefficient $g_R$ is mainly composition dependent, and the field overlap coefficient $A_{sp}$ is given by:

$$A_{sp} = 2\pi \frac{\int dr E_s(r)^2 \cdot \int dr E_p(r)^2}{\int dr E_s(r)^2 E_p(r)^2}$$

in terms of the signal and pump fields $E_s$ and $E_p$

The effective area of the fiber at the signal wavelength $\lambda s$ is given by $$A_{eff,s} = 2\pi \frac{\left(\int dr E_s(r)^2\right)^2}{\int dr E_s(r)^4}$$

where Es is the electric field associated with signal light propagated in the fiber at a wavelength $\lambda s$, and r is the radius of the fiber.

The effective area at the pump wavelength $\lambda p$ is given by a similar formula, $$A_{eff,p} = 2\pi \frac{\left(\int dr E_p(r)^2\right)^2}{\int dr E_p(r)^4}$$

where Ep is the electric field associated with pump light propagated in the fiber at a wavelength $\lambda p$, and r is the radius of the fiber.

Using Hölder's integral inequality, it can be shown that the overlap coefficient $A_{sp}$ satisfies $$A_{sp} \geq \sqrt{A_{eff,s} A_{eff,p}}$$

For a fixed signal effective area then, reducing the pump effective area is a necessary condition for reducing $A_{sp}$ and thereby for increasing Raman efficiency.

In fact, for the fiber profiles considered here, numerical integrations show that, to a very good approximation (within a few hundredths of a square micron), $$A_{sp} \approx \sqrt{A_{eff,s} A_{eff,p}}$$

That is, $A_{sp}$ is very nearly the geometric mean of the signal and pump effective areas. Therefore reducing the pump effective area is also a sufficient condition for reducing $A_{sp}$. In commercial large effective area fibers used with Raman amplification (comparative fibers), the difference in effective areas at the signal and pump wavelengths is very small, so that $A_{sp}$ is about equal to the effective area of the fiber at the signal wavelength. (In such comparative fibers the effective area at the signal wavelength (Aeff,s) is about equal to $A_{eff,p}$. For example in such comparative fibers $(A_{eff,s}-A_{eff,p})/A_{eff,s}$ is about 0.04 or less when $\lambda s - \lambda p = 50$ nm.

In contrast, the exemplary fiber embodiments described herein have significantly lower pump effective areas $A_{eff,p}$ for given signal effective areas $A_{eff,s}$. For example, in some exemplary fiber embodiments when the pump wavelength and a signal wavelength are separated by 50 nm, the fibers have effective areas at these wavelengths such that $(A_{eff,s}-A_{eff,p})/A_{eff,s}$ is at least 0.07 (i.e., 7%), and preferably at least 0.09 (i.e., at least 9%), for example 0.07 to 0.2, or 0.09 to 0.15, or to 0.20. That is, we minimized the overlap coefficient $A_{sp}$ while holding $A_{eff,s}$ fixed, i.e., by reducing $A_{eff,p}$ relative to $A_{eff,s}$.

Also, for example, in the exemplary fiber embodiments described herein when the pump and a signal wavelengths are separated by about 100 nm, the fibers have $(A_{eff,s}-A_{eff,p})/A_{eff,s}$ of at least 0.1 (i.e., at least 10%), or at least 0.11 (i.e., at least 11%), and in some embodiments of at least 0.12 (i.e., at least 12%), or 0.13 (i.e., at least 13%), or at least 0.15 (i.e., at least 15%), and in some embodiments at least 0.18 (i.e., at least 18%), for example 0.1 to 0.3 (10% to 30%), or 0.1 to 0.27 (10% to 27%), or 0.1 to 0.26 (10% to 26%), or 0.12 to 0.26 (13%-26%), 0.15 to 0.26 (15%-26%), or 0.18 to 0.26 (18% to 26%), or 0.18 to 0.25 (18% to 25%).

Also, for example, in the exemplary fiber embodiments when the pump wavelength and the signal wavelength are separated by about 110 nm, the fibers have $(A_{eff,s}-A_{eff,p})/A_{eff,s}$ of at least 0.11 (i.e., at least 11%), or even at least 0.15 (i.e., at least 15%), and preferably at least 0.18 (i.e., at least 18%), and in some embodiments at least 0.19 (i.e., at least 19%), for example 0.15 to 0.30 (i.e., 15%-30%), or 0.15 to 0.27 (i.e., 15%-27%), or 0.19 to 0.27 (i.e., 20%-27%).

Also, for example, in the exemplary fiber embodiments when the pump and a signal wavelength are separated by 120 nm, the fibers have $(A_{eff,s}-A_{eff,p})/A_{eff,s}$ of at least 0.12 (i.e., at least 12%), or at least 0.15 (i.e., at least 15%), or at least 0.18 (i.e., at least 18%), and in some embodiments at least 0.20 (i.e., at least 20%) for example 0.15 to 0.3 (i.e., 15%-30%), or 0.2 to 0.3 (i.e., 20%-30%).

In some of the exemplary embodiment described herein, the fiber has an effective area $Aeff,_{\lambda=1525}$ of $LP_{01}$ mode at a wavelength $\lambda=1525$ nm such that 80 $\mu m^2 < Aeff,_{\lambda=1525} < 200$ $\mu m^2$; and an effective area $Aeff,_{\lambda=1475}$ of $LP_{01}$ mode at wavelength $\lambda=1450$ nm such that 75 $\mu m^2 < Aeff,_{\lambda=1475} < 150$ $\mu m^2$ (e.g., 75 $\mu m^2 < Aeff,_{\lambda=1475} < 145$ $\mu m^2$) and wherein $Aeff,_{\lambda=1525} > Aeff,_{\lambda=1475}$ such that $(Aeff,_{\lambda=1525}-Aeff,_{\lambda=1475})/Aeff,_{\lambda=1525} \geq 0.1$. In some of these embodiments $(Aeff,_{\lambda=1525}-Aeff,_{\lambda=1475})/Aeff,_{\lambda=1525} \geq 0.11$ and in some embodiments $(Aeff,_{\lambda=1525}-Aeff,_{\lambda=1475})/Aeff,_{\lambda=1525} \geq 0.12$, and in some embodiments $(Aeff,_{\lambda=1525}-Aeff,_{\lambda=1475})/Aeff,_{\lambda=1525} \geq 0.13$.

According to some embodiments the optical fiber has: (i) an effective area Aeff,s of $LP_{01}$ mode such that for a wavelength λs, 75 μm² <Aeff,s <250 μm² where the wavelength λs is 1610 nm>λs>1525 nm, and (ii) an effective area Aeff,p of $LP_{01}$ mode such that at a wavelength λp the effective area at the pump wavelength is 60 μm²< Aeff,1450<180 μm² (e.g., 65 μm²<Aeff,p<170 μm², or 60 μm²<Aeff,p<140 μm², or in some embodiments 75 μm² to 140 μm²), and the wavelength is 1510 nm>λp>1420 nm and 50 nm ≤λs−λp≤125 nm, and (iii) (Aeff,s−Aeff,p)/Aeff,s is at least 0.12. For example, for some embodiments, 0.13≤ (Aeff,s−Aeff,p)/Aeff,s≤30.

Figure 1:
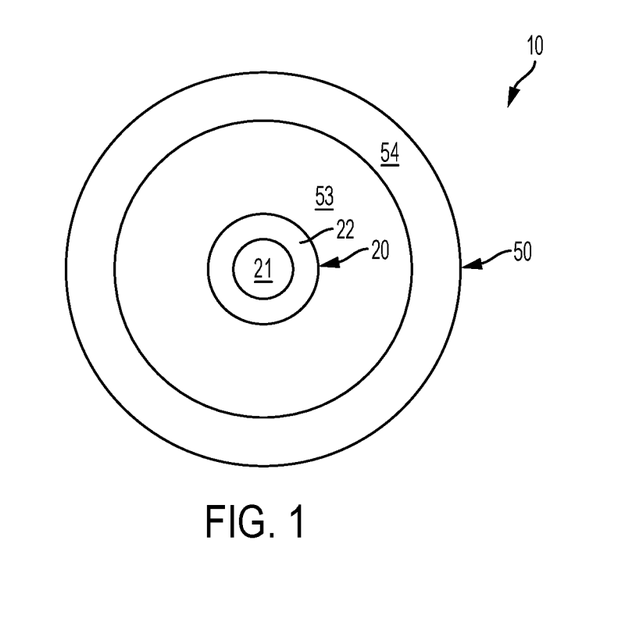
FIG. 1 is a schematic cross-sectional view of one embodiment of an optical fiber.
Figure 2:
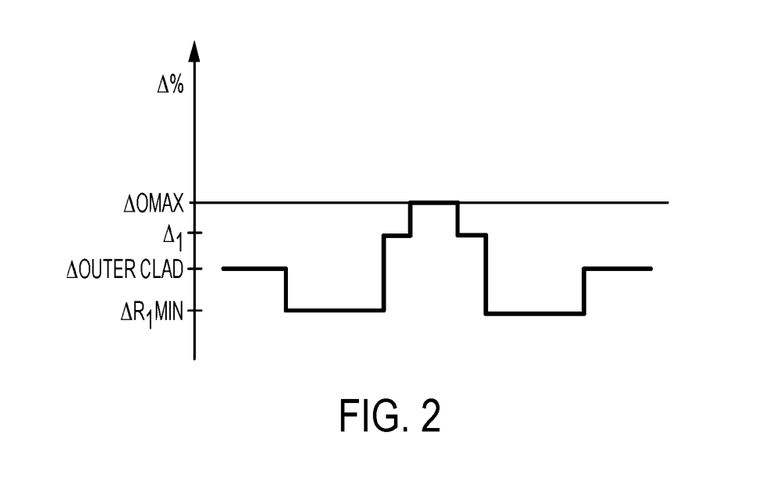
FIG. 2 illustrates schematically the refractive index delta profile of the exemplary optical fiber embodiment of FIG. 1.

FIG. 1 is a cross sectional view of an optical fiber ("fiber") 10 embodiments according to the disclosure and its corresponding refractive index profiles. The various example embodiments of fiber 10 are now described below with respect to cross-sectional view of the fiber and plots of the corresponding refractive index profile(s). FIG. 2 illustrates schematically the refractive index profile of FIG. 1 fiber.

Without being bound by theory, the following is a simplified explanation of how $A_{\mathit{eff},p}$ is reduced relative to $A_{\mathit{eff},s}$. As can be seen from FIGS. 1 and 2, the fiber embodiments 10 have a step-index core 20. The core includes a central, inner core region 21 and an annular outer core region 22 that is adjacent to and surrounds the inner core region, and the inner core region 21 has higher refractive index than the outer core region 22. Conceptually speaking, the idea is to choose the parameters (refractive index deltas and radii) of the inner core region and the outer core region in such a way, that the lower wavelength λp (i.e. pump) light ideally "sees" mostly the inner region core, which has higher index than that of the outer region of the core, and hence more confining than the outer core region, whereas the larger wavelength λs (i.e., signal) light "sees" the entire core, which has a lower refractive index on average and hence is less confining That is, if the entire core "acts" as a core for the signal wavelength, and the inner core "acts" as a core for the pump wavelength, then the differences between $A_{\mathit{eff},s}$ and $_{A\mathit{eff},p}$ are maximized, and $A_{\mathit{eff},p}$ is reduced relative to $A_{\mathit{eff},s}$. This is a simplified explanation of the concept involved, and not a rigorous explanation, because of course both the short and long wavelengths (i.e., the light of both the signal and the pump wavelengths) actually permeate the entire core, albeit in different amounts. However, the fiber embodiments described herein are optimized to confine a relatively large amount of light (or as much as possible) in the pump wavelength in the inner core, while spreading the confinement of light at the signal wavelength within the entire core cladding. More specifically, we numerically optimized the parameters of inner and outer core regions (widths and refractive index deltas) to get a large (and preferably the largest possible) difference between the spatial distributions of light intensity at short and long wavelengths λp, λs, in order to reduce or minimize $A_{\mathit{eff},p}$ for given signal effective area $A_{\mathit{eff}}$. The moat depth (i.e., the refractive index depression within the cladding relative to that of the outer core and to that of the outer cladding, i.e., the minimum refractive index delta of low index ring 53 situated within the cladding 50) is also an important optimization variable, as it also effects the differential confinement between the energy fields for each wavelength. We utilized scalar Helmholtz equation mode solver to perform this optimization. Helmholtz equation mode solving algorithms are known to those of skill in the art, and the software for solving Helmholtz equations is commercially available.

An effective area Aeff of the $LP_{01}$ of signal mode (i.e., in the signal wavelength) of the may be between about 75 μm² and 250 μm², for example between 80 μm² and 200 μm², or 80 μm²<Aeff,s<160 μm², or 80 μm²<Aeff,s<150 μm². The signal and pump wavelengths may be separated, for example by 50 nm, 75 nm, 80 nm, 90 nm, 100 nm, 120 nm, or therebetween. The signal wavelength λs may be, about 1550 nm, for example 1545nm to 1555 nm, or for example 1548 nm to 1552 nm. The pump wavelength may be, for example 1425 nm to 1475 nm, (e.g., about 1450 nm, or 1445 nm to 1455nm).

Thus, according to at least some of the embodiments described herein the optical fiber 10 has: (i) an effective area $A_{\mathit{eff},s}$ of at a signal wavelength λs, and
(ii) an effective area $A_{\mathit{eff},p}$ of at a pump wavelength λp, where 50 nm<λs−λp<125 nm; such that (Aeff,s−Aeff,p)/ Aeff,s is at least 0.012 (i.e., at least 12%), for example at least 0.13 (i.e., at least 13%), or at least at least 0.15 (i.e., at least 15%), or 0.12 to 0.3, or 0.12 to 0.25 (i.e., 12%-25%). In some embodiments, for example where 50 nm≤λs−λp≤60 nm, (Aeff,s−Aeff,p)/Aeff is about 0.09 to about 0.15 (i.e., 9%-15%).

For example, in some embodiments λs−λp is about 100 nm where λs is about 1550 nm and λp is about 1450 nm and the fiber core is structured such that $(A_{\mathit{eff},1550}-A_{\mathit{eff},1450})/A_{\mathit{eff},1450}$ is at least 0.11, or at least 0.13, for example between 0.12 and 0.3, or between 0.13 and 0.27, and in some embodiments between 0.7 and 0.15. According to at least some of the embodiments described fiber has a maximum refractive index delta of the core, $\Delta_0$ in % measured relative to pure $SiO_2$, wherein −0.02%≤$\Delta_0$≤0.1%.

According to at least some of the embodiments described herein an optical fiber 10 Comprises a two-region core 20 surrounded by the cladding 50 and has: (i) an effective area $A_{\mathit{eff},s}$ of at a signal wavelength, λs, and (ii) an effective area $A_{\mathit{eff},p}$ of at a pump wavelength λp, where 80 nm<λs−λp<110 nm; such that (Aeff,s−Aeff,p)/Aeff,s is at least 0.11 (i.e., at least 11%) 0.12 (at least 12%), or at least 0.13 (or at least 13%). For example, in some embodiments the separation between the signal wavelength and the pump wavelength, λs−λp, is between 95 nm and 105 nm (e.g., between 98 nm and 102 nm) and (Aeff,s−Aeff,p)/Aeff,s is about 0.13 to about 0.3, (e.g., 0.13-0.25). According to at least some of the embodiments described herein an optical fiber comprises a core 20 structured such that the fiber 10 has: (i) an effective area $A_{\mathit{eff},s}$ of at a signal wavelength, λs, and (ii) an effective area $A_{\mathit{eff},p}$ of at a pump wavelength λp, where 80 nm<λs−λp<110 nm; such that (Aeff,s−Aeff,p)/Aeff,s is 0.13-0.27. These fiber embodiments have a maximum refractive index delta of the core, $\Delta_0$ in % measured relative to pure $SiO_2$, wherein −0.02%≤$\Delta_0$≤0.1%.

According to some embodiments the optical fiber 10 comprises:
(I) a Ge-free silica based core 20 having an inner core region 21 with the maximum refractive index delta $\Delta_0$ wherein −0.02%≤$\Delta_0$≤0.1%, and an outer core region 22 with the refractive index delta $\Delta_1$, where $\Delta_0$>$\Delta_1$, and −0.25≤$\Delta_1$<−0.08, and alpha value α wherein α≥5 (for example, 12 or 15, or 20, or 25, or here between; such that the fiber has:
(i) an effective area Aeff,s of $LP_{01}$ mode such that at a signal wavelength λs, 80 μm²<Aeff,s<160 μm² where 1565 nm>λs>1525 nm, (ii) an effective area Aeff,p of $LP_{01}$ mode such that at a pump wavelength λp, 60 μm² <Aeff,p<150 μm² (e.g., 75 μm₂-145 μm²)
where 1480 nm>λp>1420 nm and 50 nm<(λs-λp)<125 nm; and
(iii) (Aeff,s-Aeff,p)/Aeff,s≥0.12 (e.g., 0.12 to 0.3, or 0.13 to 0.26); and
(II) an annular cladding 50 surrounding the core 20, the cladding 50 comprising:
(i) a low index ring 53 surrounding the core and having a minimum refractive index delta $\Delta_{RMIN}$, wherein and $\Delta_{RMIN}<\Delta_1$ and (b) $\Delta_{RMIN}\leq-0.35$ measured relative to pure $SiO_2$; and
(ii) an outer cladding 54 with a refractive index delta $\Delta_{Outer-Clad}$ relative to pure silica, such that $\Delta_{Outer-Clad}>\Delta_{RMIN}$; and the difference between the relative refractive index of the core $\Delta_0$ and the outer cladding $\Delta_{Outer-Clad}$ is $|\Delta_0-\Delta_{Outer-Clad}|>0.05\%$.

For example, according to at least some of the embodiments described herein an optical fiber comprises a core with an inner core region and an outer core region; such that the fiber has: an effective area $A_{eff,s}$ of at a signal wavelength, λs, and (ii) an effective area $A_{eff,p}$ of at a pump wavelength λp, where 90 nm<λs-λp<110 nm; such that (Aeff,s-Aeff,p)/Aeff,s is at least 0.11 (e.g., 0.11 to 0.27).

According to at least some of the embodiments described herein an optical fiber has: (i) an effective area $A_{eff,s}$ of at a signal wavelength, λs, and (ii) an effective area $A_{eff,p}$ of at a pump wavelength λp, where 95 nm<λs-λp<105 nm; such that (Aeff,s-Aeff,p)/Aeff,s is at least 0.1 (e.g., at least 0.11). According to at least some of the embodiments described herein an optical fiber comprises a core having: (i) an effective area $_{Aeff,s}$ of at a signal wavelength, λs, and (ii) an effective area $A_{eff,p}$ of at a pump wavelength λp, where 90 nm<λs-λp<110 nm; such that (Aeff,s-Aeff,p)/Aeff,s is at least 11%. According to at least some of the embodiments described herein an optical fiber comprises a core such that the fiber exhibits: (i) an effective area $A_{eff,s}$ of at a signal wavelength, λs, and (ii) an effective area $A_{eff,p}$ of at a pump wavelength λp, where 95 nm<λs-λp<105 nm; such that (Aeff,s-Aeff,p)/Aeff,s is at least 0.12. According to at least some of the embodiments described herein an optical fiber has: (i) an effective area $A_{eff,s}$ of at a signal wavelength, λs, and (ii) an effective area $A_{eff,p}$ of at a pump wavelength λp, where 95 nm<λs-λp<105 nm; such that (Aeff,s-Aeff,p)/Aeff,s is 12%-26%. According to some embodiments 1545 nm<λs<1555 nm, 1445 nm<λp<1455 nm, and (Aeff,s-Aeff,p)/Aeff,s is 0.11 to 0.27. In the exemplary fiber embodiments described herein the maximum refractive index delta of the core, $\Delta_0$ in % measured relative to pure $SiO_2$, is $-0.02\%\leq\Delta_0\leq0.1\%$.

According to at least some embodiments the optical fiber includes a Ge-free silica based core 20, and the fiber has (i) an effective area Aeff,s of $LP_{01}$ mode such that for the wavelength of 1550 nm, 80 μm²<$Aeff_{,1550}$<200 μm²; and (ii) an effective area Aeff,p of $LP_{01}$ mode such that for the wavelength of 1450 nm, 60 μm²<$Aeff_{,1450}$<180 μm², and $Aeff_{,1450}$<$Aeff_{,1550}$; and the optical fiber is structured such that: for all wavelengths λs' and λp' the effective area Aeff,s' of $LP_{01}$ mode at the wavelengths λp' and the effective areas Aeff,p' of $LP_{01}$ mode at the wavelengths λp' satisfy the following inequality: (Aeff,s'-Aeff,p')/Aeff,s'≥0.11, wherein (i) 80nm≤(λs'-λp')≤110 nm, and (ii) the wavelength λs' are situated in the 1525 nm to 1610 nm wavelength range and (iii) wavelengths λp' are situated in the 1420 nm to 1510 nm range. In some embodiments 0.02≥(Aeff,s'-Aeff,p')/Aeff, s'≥0.11, for example 0.30≥(Aeff,s'-Aeff,p')/Aeff,s'≥0.11. For example, in at least some fiber embodiments 0.03≥(Aeff,s'-Aeff,p')/Aeff,s'≥011 for all wavelengths λs' situated between 1540 nm and 1550 nm and all wavelengths λp' situated between 1440 and 1450, and as one can see 1550 nm-1440 nm=110 nm. Also for example, in at least some fiber embodiments, 0.3≥(Aeff,s'-Aeff,p')/Aeff,s'≥0.13 for all wavelengths λs' between 1545 nm and 1555 nm and for all wavelengths λp' situated between 1445 nm and 1455 nm, and as one can see 1555 nm-1445 nm=110 nm.

As described above, fiber embodiments 10 further include an annular cladding 50 surrounding the core. The cladding 50 includes: (i) a low index ring 53 directly adjacent to and surrounding the outer core region 22, and (ii) an outer cladding 54 with a refractive index delta $\Delta_{Outer-Clad}$. The relative refractive index of the low index ring is smaller than that of the outer core region, and is smaller than that of the outer cladding.

We had discovered that these fiber embodiments can advantageously provide improved Raman efficiency relative to comparative Raman fibers with the same large effective area in the same signal band. The fiber exemplary fiber embodiments described herein have decreased effective area in the pump wavelength band (relative to the effective area of the signal wavelength band (i.e., small $A_{eff,p}$ relative to $A_{eff,s}$). We also discovered that because the fiber embodiments described herein have improved Raman efficiency ($g_R/\alpha A_{sp}$) relative to the conventional comparative example fibers used for Raman applications, better use may be made of available pump power even if the effective area of the fiber in the pump wavelength range is already relatively small. Advantageously, pump power consumption can be reduced, for example, by about 5% (relative to conventional step index fiber designs) using the embodiments of the fibers disclosed herein in Table 1.

More specifically the advantage of the optical fiber embodiments described herein is that they have higher predicted Raman efficiencies than other fibers with the same large effective areas (at the same signal wavelength). This benefit in efficiency may be used to increase the reach or capacity of a long-haul fiber optic link.

The effective area at the pump wavelength is smaller than that at the signal wavelength, and if we write $$A_{eff,p}=(1-\varepsilon)A_{eff,s}$$

then we have that the Raman gain G satisfies $$G \propto \frac{g_R}{A_{eff,s}}\left(1+\frac{1}{2}\varepsilon\right)$$

In comparative, commercially available large effective area step-index fibers (Aeff of 150 μm² at 1550 nm) for Raman applications, when the fibers are modeled with the pump wavelength of 1475 nm and 1525 nm signal wavelength, the value of ε is about 4% or less. In contrast, for fiber embodiments disclosed herein 7%≤ε≤30%, for example 7%≤ε≤20%, for example 8%≤ε≤20%, for example 9%≤ε≤20%, or for example 9%≤ε≤15% at the same signal and pump wavelengths. For example, in in some embodiments, ε is at least 13%. Relative to the above described comparative step index fiber with ε of about 4%, the fiber embodiment with ε=13% provides about a 4.5% increase in the Raman gain coefficient $G_R$. This translates to a 4.5% reduction in pump power needed to achieve the same Raman gain. Similarly, a fiber embodiment with ε=15% provides about a 5.5% increase in the Raman gain coefficient $G_R$. This translates to a 6% reduction in pump power needed to achieve the same Raman gain. Also Similarly, the fiber embodiment with ε=20% provides about a 8% increase in the Raman gain coefficient $G_R$. This translates to a 8% reduction in pump power needed to achieve the same Raman gain Relative to a similar comparative fiber operating at the same signal and pump wavelengths.

Various embodiments will be further clarified by the following examples.

Example 1

As described above, FIG. 1 is a cross sectional view of an optical fiber ("fiber") 10 embodiments according to the disclosure and FIG. 2 illustrates schematically this fiber's corresponding refractive index profile. Table 1A, 1B, 2 and 3, below, provide parameters for several exemplary fiber embodiments.

The optical fiber embodiments 10 depicted in Tables 1A-1B comprise a Ge-free silica based core 20, a cladding 50, and at least one coating 60 (not shown) surrounding the glass cladding 50. In these embodiments the core index profile is a step index profile with α>10, and the core 20 includes an inner core region 21 and an outer core region 22. The outer core region has a lower refractive index than the inner core region. The outer radius of the inner core region 20 is $R_1$. The outer radius of the outer core region 20 is $R_2$. Thus, the outer radius of the core 20 is $R_2$. The cladding includes a moat (a low refractive index ring, also referred to herein as a low index ring)) 53, and outer cladding 54. The outer radius of the cladding 50 is $R_{outer}$. In the exemplary embodiments described herein $R_{outer}$=62.5 μm. In alternative embodiments $R_{outer}$ may be different, for example between 62.5 μm and 125 μm.

Preferably, to at least some embodiments, the relative refractive index profile of the optical fiber 10 is structured to provide attenuation of less than 0.18 dB/km (e.g., 0.14 dB/km to 0.178 dB/km) at the 1550 nm wavelength.

The central core region 21 may be pure silica, or silica doped with Cl, and has an index of refraction that is approximately that of pure silica. For example, the core region 22 may also include chlorine (e.g. <0.05 wt %), or some alkali, for example potassium (e.g., <0.05 wt %, or 20 to 1000 ppm by weight) to control its viscosity. The relative refractive index (also referred to herein as refractive index delta) of the core region 21 is, for example, $-0.02\% \leq \Delta_0 \leq 0.1\%$; and in some embodiments $-0.002\% < \Delta_{0max} < 0.002\%$, relative to pure silica. In some embodiments the outer core radius $R_1$ is about 3 μm to 6 μm.

The core 20 is surrounded by the cladding 50. The cladding 50 is down-doped relative to the core 20 (and relative to pure silica), and contains fluorine (F) or boron (B) as a down dopant. In the exemplary embodiments described herein, the downdopant is Fl. It may also include chlorine (e.g. <0.05 wt %), or some alkali, for example potassium (e.g., <0.05 wt %, or 20 to 1000 ppm by weight) to control its viscosity.

The core 20 is surrounded a cladding with a low index ring 53 (also referred as a moat herein) having a relative refractive index delta ($\Delta_{R,MIN}$) and an outer radius $R_3$. (As described herein, a moat is a low refractive index cladding region situated between a core and an outer cladding region, and is the lowest refractive index portion of the cladding.) The low index ring (moat) 53 can be made of glass doped with an index decreasing dopant such as F, or B. The outer cladding layer 54 has an outer radius $R_{outer}$ and a higher maximum index of refraction than that of the low index ring 53, the outer cladding surrounds and is in directly contact with the low index ring 53. Preferably $\Delta_{0MAX} > \Delta_{cladMAX} > \Delta_{R,MIN}$, where is the $\Delta_{cladMAX}$ is maximum refractive index of the cladding 50. In the exemplary embodiments of FIG. 2, $\Delta_{0MAX} > \Delta_1 > \Delta_{R,MIN}$ and $\Delta_{Outer-Clad} > \Delta_{R,MIN}$. In the exemplary embodiment of FIG. 2 the relative refractive index delta ($\Delta_{outer-clad}$) of the outer cladding 54 is −0.2%, but it can be higher or lower than −0.2%. In the embodiment of FIG. 2 the core alpha is at least 5, preferably 6<α<25, for example α=10.

Table 1A and 1B illustrate the properties of eight embodiments of exemplary optical fiber 10. Table 1 B shows the effective areas of the fiber at the signal wavelength of 1525 nm, and at the pump wavelength of 1475 nm embodiments

TABLE 1A

| fiber | Refractive index deltas (%) $\Delta_{0MAX}$; $\Delta_1$; $\Delta_{R,MIN}$; $\Delta_{Outer-Clad}$ | core radius $r_1$ | outer core region radial width ($r_2 - r_1$) | $R_1/R_2$ | ring radial width $R_3 - R_2$ |
|---|---|---|---|---|---|
| 1 | 0.08, −0.089, −0.37, −0.2 | 4.22 | 11.33 | 0.27 | 15.00 |
| 2 | 0.08, −0.087, −0.37, −0.2 | 4.75 | 12.00 | 0.28 | 15.00 |
| 3 | 0.08, −0.089, −0.37, −0.2 | 5.31 | 11.52 | 0.32 | 15.00 |
| 4 | 0.08, −0.139, −0.37, −0.2 | 5.01 | 11.29 | 0.31 | 15.00 |
| 5 | 0.08, −0.222, −0.37, −0.2 | 3.81 | 12 | 0.24 | 15.00 |
| 6 | 0.08, −0.222, −0.37, −0.275 | 3.81 | 12 | 0.24 | 15.00 |
| 7 | 0.08, −0.223, −0.45, −0.2 | 3.52 | 12 | 0.23 | 15.00 |
| 8 | 0.08, −0.223, −0.45, −0.275 | 3.52 | 12 | 0.23 | 15.00 |

TABLE 1B

| fiber | LP02 cutoff* | LP11 cutoff* | 1550 pin array (dB)* | Aeff (μm²) at λ = 1475 nm | Aeff (μm²) at λ = 1525 nm | Epsilon ε |
|---|---|---|---|---|---|---|
| 1 | 1.67 | 2.14 | 6.56 | 134.08 | 154.19 | 13.04% |
| 2 | 1.81 | 2.35 | 3.88 | 136.00 | 154.79 | 12.14% |
| 3 | 1.819 | 2.37 | 2.30 | 138.56 | 154.03 | 10.04% |
| 4 | 1.41 | 1.78 | 4.52 | 111.43 | 123.04 | 9.44% |
| 5 | 0.62 | 1.01 | 41.00 | 77.43 | 87.75 | 11.76% |
| 6 | 1.39 | 1.60 | 5.22 | 77.43 | 87.75 | 11.76% |
| 7 | 0.57 | 0.93 | 36.00 | 76.44 | 88.10 | 13.23% |
| 8 | 1.30 | 1.48 | 2.59 | 76.44 | 88.10 | 13.23% |

In some embodiments 1610 nm>λs>1525 nm, and 50 nm<( λs−λp)<125 nm; and 1510 nm>λp>1420 nm. Typically ( λs−λp) is about 90-110 nm (e.g., about 100 nm). However, in the embodiments of Table 1 the signal wavelength λs was chosen to be 1525 nm, and the pump wavelength λp was chosen to be 1475 nm (i.e., in Table 1 embodiments, λs−λp=50 nm). These values of signal and pump wavelength are much closer (50 nm) than would be usually encountered in common Raman amplifier application, where pump-signal separations on the order of 100 nm are typical (and such separation is shown in Table 2). However, by using such closely spaced signal and pump wavelengths, we obtain a lower bound on achievable ε values (as they increase with increased pump-signal wavelength separation.)

As shown in Table 1, the effective area of the fiber at a signal wavelength is much bigger than the effective areas at the pump wavelength, for example by at least 10 μm², and in some embodiments by at least 15 μm², and in some embodiments by at least 20 μm². The larger the difference, the large is ε, and the larger is the increase in the Raman gain coefficient $G_R$. When the difference between the signal and the pump wavelength in the embodiments of Table 1 is increased (for example λs–λp is increased to 75 nm, 100 nm, 125 nm, or therebetween), the difference between the effective areas Aeff,s and Aeff,p is also increased, further increasing the value the value of ε and Raman gain G at specified $A_{eff,s}$.

The relative refractive index delta of the outer cladding 54 can be changed to influence mode cutoffs without significantly impacting the effective areas. (Note: the cutoffs wavelengths of for the fibers can be modified by changing $\Delta_{Outer-Clad}$, and thus ate denoted with an asterisk (*) in Table 1. As the $\Delta_{Outer-Clad}$ increases, the cutoff wavelength decreases. The more negative is the value of $\Delta_{Outer-Clad}$, the larger is the cutoff wavelength. The pin array bend loss value is also impacted by outer cladding's delta. Furthermore, for the Table 1A, 1B fiber embodiments, it appears that some of the fibers cannot be strictly single mode without inducing high pin array bend loss values. As an example, compare fibers 5 and 6 or 7 and 8 in Table 1A, 1B. These pairs differ only in the outer cladding layer refractive index. The trade-off between pin array and cutoff wavelength is clearly seen. Thus, by changing the refractive index delta of the outer cladding (for example, between –0.2% and –0.275%) one can arrive experimentally at an optimal required combination. The fibers embodiments 5-9 are single mode fibers. Fibers 1-4 of Table 1A are few mode fibers or quasi-single mode fibers.

According to at least some embodiments an optical fiber comprises:

(I) a silica based core with an inner core region with maximum refractive index delta of the core, $\Delta_0$ in % measured relative to pure $SiO_2$ such that $-0.02\% \leq \Delta_0 \leq 0.1\%$ and an outer region with a minimum refractive index delta $\Delta_1$, where $-0.25 \leq \Delta_1 < -0.08$, the fiber having:
  (i) an effective area $Aeff,_{\lambda=1525}$ of $LP_{01}$ mode at a wavelength λ=1525 nm such that 80 μm² < $Aeff,_{\lambda=1525}$ < 200 μm²; and
  (ii) an effective area $Aeff,_{\lambda=1475}$ of $LP_{01}$ mode at wavelength λ=1450 nm such that 75 μm² < $Aeff,_{\lambda=1475}$ < 180 μm², wherein $Aeff,_{\lambda=1525}$ > $Aeff,_{\lambda=1475}$; and ($Aeff,_{\lambda=1525}$ – $Aeff,_{\lambda=1475}$)/$Aeff,_{\lambda=1525}$ ≥ 0.07; and (II) an annular cladding surrounding the core, the cladding including:
  (i) a low index ring surrounding the inner cladding region and having a minimum refractive index delta $\Delta_{R,MIN}$, where $\Delta_{RMIN} < \Delta_0$ and (b) $\Delta_{R,MIN} \leq -0.35$ measured relative to pure $SiO_2$; and
  (ii) an outer cladding with a refractive index delta $\Delta_{Outer-Clad}$ relative to pure silica, such that $\Delta_{Outer-Clad} > \Delta_{R,MIN}$; and the absolute difference between the relative refractive index of the core $\Delta_0$ and the outer cladding $\Delta_{Outer-Clad}$ is $|\Delta_0 - \Delta_{Outer-Clad}| > 0.05\%$.

Table 2 is similar to Table 1, but illustrates parameters of exemplary fibers that were utilized with a 1550 nm signal wavelength and 1450 nm pump wavelength. The fibers are identical to those of Table 1A, but now the effective areas Aeff,s and Aeff,p are calculated at signal wavelength of 1550 nm, and the pump wavelength of 1450 nm ((λs–λp)=100 nm). Table 2 illustrates that in these embodiments the effective areas for the signal wavelength Aeff,s=$Aeff,_{\lambda=1550}$ vary between 93.9 μm² and 164.5 μm², and the effective areas for the pump wavelengths Aeff,p=$Aeff,_{\lambda=1450}$ vary between 70.5 μm² and 131 μm². The corresponding epsilon parameter are 18 to 25%, and ($A_{eff,s} - A_{eff,p})/A_{eff,s}$ is between 0.18 and 0.25. Because of the larger difference between Aeff,s and Aeff,p vs. than that shown in Table 1A, the value of ε and Raman gain coefficient G are also increased for a given effective area at the signal wavelength.

TABLE 2

| fiber | Aeff (μm²) at λ = 1450 nm | Aeff (μm²) at λ = 1550 nm | Epsilon ε |
|---|---|---|---|
| 1 | 124.03 | 164.25 | 24.49% |
| 2 | 126.61 | 164.19 | 22.89% |
| 3 | 130.83 | 161.77 | 19.13% |
| 4 | 105.63 | 128.84 | 18.02% |
| 5 | 72.27 | 92.91 | 22.22% |
| 6 | 72.27 | 92.91 | 22.22% |
| 7 | 70.61 | 93.93 | 24.83% |
| 8 | 70.61 | 93.93 | 24.83% |

According to some embodiments 80 μm² < $Aeff,_{\lambda=1550}$ < 250 μm² and 70 μm² < $Aeff,_{\lambda=1450}$ < 215 μm².

According to some embodiments, an optical fiber includes:

(I) a silica based core with an inner core region with maximum refractive index delta of the core, $\Delta_0$ in % measured relative to pure $SiO_2$ such that $-0.02\% \leq \Delta_0 \leq 0.1\%$ and an outer region with a minimum refractive index delta $\Delta_1$, where $-0.25 \leq \Delta_1 < -0.1$, the fiber having:
  (i) an effective area $Aeff,_{\lambda=1550}$ of $LP_{01}$ mode at a wavelength λ=1550 nm such that 80 μm² < $Aeff,_{\lambda=1550}$ < 200 μm²; and
  (ii) an effective area $Aeff,_{\lambda=1450}$ of $LP_{01}$ mode at wavelength λ=1450 nm such that 60 μm² < $Aeff,_{\lambda=1450}$ < 180 μm², wherein $Aeff,_{\lambda=1550}$ > $Aeff,_{\lambda=1450}$, and ($Aeff,_{\lambda=1550}$ – $Aeff,_{\lambda=1450}$)/$Aeff,_{\lambda=1550}$ ≥ 0.1; and (II) an annular cladding surrounding the core, the cladding including:
  (i) a low index ring surrounding the inner cladding region and having a minimum refractive index delta $\Delta_{R,MIN}$, where $A_{RMIN} < \Delta_0$ and (b) $\Delta_{R,MIN} \leq -0.35$ measured relative to pure $SiO_2$; and
  (ii) an outer cladding with a refractive index delta $\Delta_{Outer-Clad}$ relative to pure silica, such that $\Delta_{Outer-Clad} > \Delta_{R,MIN}$; and the absolute difference between the relative refractive index of the core $\Delta_0$ and the outer cladding $\Delta_{Outer-Clad}$ is $\Delta_0 - \Delta_{Outer-Clad}| > 0.05\%$.

Table 3 is similar to Table 2, but illustrates parameters of exemplary fibers that were utilized with a 1555 nm signal wavelength and 1425 nm pump wavelength (i.e., λs–λp=125 nm). Table 3 illustrates that for the embodiments of Table 3 the effective area for the signal wavelength Aeff,s=$Aeff,_{\lambda=1555}$ vary between 95 μm² and 166.25v, and the effective areas for the pump wavelengths Aeff,p= $Aeff,_{\lambda=1425}$ vary between 69.4 μm² and 129.3 μm². The corresponding epsilon parameters are 19.5%-27%, and ($A_{eff,s} - A_{eff,p})/A_{eff,s}$ is 0.19 to 0.27. Thus, because of the larger difference between Aeff,s and Aeff,p vs. those shown in Table 1, the value the value of ε and Raman gain coefficient G are also increased. For example, as shown by the exemplary embodiments of Table 3, when λs=1555 nm and λ=1445 n, the value of ε is greater than 0.11, greater than 0.13, and even greater than 0.15 or 0.19

TABLE 3

| fiber | Aeff (μm²) at λ = 1445 nm | Aeff (μm²) at λ = 1555 nm | Epsilon ε |
|---|---|---|---|
| 1 | 122.01 | 164.25 | 26.61% |
| 2 | 124.73 | 164.19 | 24.89% |
| 3 | 129.28 | 166.26 | 20.84% |
| 4 | 104.46 | 166.06 | 19.65% |
| 5 | 71.24 | 163.31 | 24.17% |
| 6 | 71.24 | 130.00 | 24.17% |
| 7 | 69.44 | 93.94 | 26.97% |
| 8 | 69.44 | 93.94 | 26.97% |

According to some embodiments the optical fiber includes:

I. a silica based Ge-free core with an inner core region with maximum refractive index delta of the core, $\Delta_0$ in % measured relative to pure $SiO_2$ such that $-0.02\% \leq \Delta_0 \leq 0.1\%$ and an outer region with a minimum refractive index delta $A_1$, where $-0.25 \leq \Delta_1 < -0.08$, the fiber having:
  (i) an effective area Aeff,s of $LP_{01}$ mode such that for a wavelength λs =1550 nm, 80 μm² < Aeff,s < 200 μm²; and
  (ii) an effective area Aeff,p of $LP_{01}$ mode such that for a wavelength λp =1450 nm, 60 μm² < Aeff,p < 180 μm², and Aeff,p < Aeff,s; and
  (iii) for all wavelengths λs' and λp' where 80 nm < (λs'−λp') < 110 nm, and where λs' is situated in the 1525 nm to 1610 nm wavelength range and λp' is situated in the 1420 nm to 1510 nm range, the effective area Aeff,s' of $LP_{01}$ mode and at the wavelength λs' and the effective area Aeff,p' at the wavelength λp' are such that (Aeff,s'−Aeff,p')/Aeff,s' ≥ 0.11; and II. an annular cladding surrounding the core, the cladding including: (i) a low index ring surrounding the core and having a minimum refractive index delta $\Delta_{RMIN}$, where (a) $\Delta_{R,MIN} < \Delta_0$ and (b) $\Delta_{RMIN} \leq -0.35$ measured relative to pure $SiO_2$, and (iii) an outer cladding with a refractive index delta $\Delta_{Outer\text{-}Clad}$ relative to pure silica, such that $\Delta_{Outer\text{-}Clad} > \Delta_{RMIN}$; and the absolute difference between the relative refractive index of the core $\Delta_0$ and the outer cladding $\Delta_{Outer\text{-}Clad}$ is $|\Delta_0 - \Delta Outer\text{-}Clad| > 0.05\%$.

For example, the fiber core and the cladding of the fiber may be structured such that 0.3 ≥ (Aeff,s'−Aeff,p')/Aeff,s' ≥ 0.12 for all wavelengths λs' and λp' where 80 nm < (λs'−λp') < 120 nm, the effective area Aeff,s' of $LP_{01}$ mode being at the wavelength λs' and the effective area Aeff,p' of $LP_{01}$ mode being at the wavelength λp', and where λs' is situated in the 1525 nm to 1610 nm wavelength range and λp' is situated in the 1420 nm to 1510 nm range Similarly, in some embodiments the fiber core and cladding are structured such that that 0.3 ≥ (Aeff,s'−Aeff,p')/Aeff,s' ≥ 0.12 for all wavelengths λs' and λp' where 80 nm < (λs'−λp') < 120 nm and where λs' is situated in the 1525 nm to 1610 nm wavelength range and λp' is situated in the 1420 nm to 1510 nm range.

In some embodiments, for example, the fiber core and the cladding of the fiber may be structured such that 0.3 ≥ (Aeff,s'−Aeff,p')/Aeff,s' ≥ 0.12 for all wavelengths λs' and λp' where 50 nm < (λs'−λp') < 120 nm, the effective area Aeff,s' of $LP_{01}$ mode and at the wavelength λs' where the effective area Aeff,p' is the effective area of $LP_{01}$ mode at the wavelength λp' and Aeff,s' is the effective area Aeff,s is the effective area of $LP_{01}$ mode at the wavelength λs' and where λs' is situated in the 1525 nm to 1610 nm wavelength range and λp' is situated in the 1420 nm to 1510 nm range. In some fiber embodiments the core radii $R_1$ may be, for example, 3.5 μm to 6.5 μm, the width $w_1$ of the outer core may be, for example 11 to 13 μm, and the width $w_2$ of the low index ring may, for example, be 13-17 μm. The core 20 may have a relative refractive index of $-0.02\% \leq \Delta_0 \leq 0.1\%$. The relative refractive index ($\Delta_1$) of the outer core 22 may be, for example −0.08% to −0.25%, relative to pure silica. The relative refractive index $\Delta_{R,MIN}$ of the low index ring 53 may be, for example $\Delta_{R,MIN} \leq -0.30$, for example between −0.30% to −0.5% (e.g., −0.35-0.5%), relative to pure silica. The outer cladding 54 may have, for example, the relative refractive index $\Delta_{Outer\text{-}Clad}$ that is between −0.15% and −0.3%, where $\Delta_{Outer\text{-}Clad} > \Delta_{R,MIN}$.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. An optical fiber comprising
   (I) a silica based core having:
      (i) an inner core region with maximum refractive index delta of the core, $\Delta_0$ in % is measured relative to pure $SiO_2 \leq 0.1\%$, and
      (ii) an outer core region with a minimum refractive index delta $\Delta_1$, where $\Delta_1 < \Delta_0$;
   such that the fiber has
      (a) an effective area $Aeff_{\lambda=1525}$ of $LP_{01}$ mode at a wavelength λ=1525 nm such that 80 μm² < $Aeff_{\lambda=1525}$ < 250 μm²; and
      (b) an effective area $Aeff_{\lambda=1475}$ of $LP_{01}$ mode at wavelength λ=1450 nm such that 65 μm² < $Aeff_{\lambda=1475}$, wherein $Aeff_{\lambda=1525} > Aeff_{\lambda=1475}$, and ($Aeff_{\lambda=1525} - Aeff_{\lambda=1475}$)/$Aeff_{\lambda=1525} > 0.07$; and
   (II) an annular cladding surrounding the core, the cladding including
      (i) a low index ring surrounding the core and having a minimum refractive index delta $\Delta_{RMIN}$, where $\Delta_{RMIN} < \Delta_1$; and
      (ii) an outer cladding with a refractive index delta $\Delta_{Outer\text{-}clad}$ relative to pure silica, such that $\Delta_{Outer\text{-}clad} > \Delta_{R,MIN}$.

2. The optical fiber of claim 1 wherein $-0.02\% \leq \Delta_0 \leq 0.1\%$, and $-0.25 \leq \Delta_1 < -0.08$; and $\Delta_{RMIN} \leq -0.30$, measured relative to pure $SiO_2$.

3. The optical fiber of claim 2, wherein the core is Ge free, and the absolute difference between the relative refractive index of the core $\Delta_0$ and the outer cladding $\Delta_{Outer\text{-}Clad}$ is: $|\Delta_0 - \Delta_{Outer\text{-}Clad}| > 0.05\%$.

4. The optical fiber of claim 2, wherein 75 μm² < $Aeff_{\lambda=1475}$ < 225 μm².

5. The optical fiber of claim 2, wherein 75 μm² < $Aeff_{\lambda=1475}$ < 150 μm².

6. The optical fiber of claim 2, wherein 80 μm² < $Aeff_{\lambda=1525}$ < 200 μm².

7. The optical fiber of claim 2, wherein 80 μm² < $Aeff_{\lambda=1525}$ < 160 μm².

8. The optical fiber of claim 2, wherein 0.07 ≤ ($Aeff_{\lambda=1525} - Aeff_{\lambda=1475}$)/$Aeff_{\lambda=1525}$ ≤ 0.15.

9. The optical fiber of claim 2, wherein $0.09 \leq (Aeff_{\lambda=1525} - Aeff_{\lambda=1475})/Aeff_{\lambda=1525} \leq 0.15$.

10. The optical fiber of claim 2, wherein said core is Ge-free core with alpha value $\alpha \geq 8$.

11. The optical fiber of claim 1, wherein said inner core region and said outer core region have the refractive indices $\Delta_0$, $\Delta_1$ and outer radii such that the fiber has
  (i) an effective area $Aeff_{\lambda=1550}$ of $LP_{01}$ mode at a wavelength $\lambda=1550$ nm, and $80 \ \mu m^2 < Aeff_{\lambda=1550} < 250 \ \mu m^2$; and
  (ii) an effective area $Aeff_{\lambda=1450}$ of $LP_{01}$ mode at wavelength $\lambda=1450$ nm, and $65 \ \mu m^2 < Aeff_{\lambda=1450} < 225 \ \mu m_2$, and wherein
  (iii) $Aeff_{\lambda=1550} > Aeff_{\lambda=1450}$, and $(Aeff_{\lambda=1550} - Aeff_{\lambda=1450})/Aeff_{\lambda=1550} \geq 0.1$.

12. The optical fiber according to claim 11, wherein the core is a Ge-free core and wherein said inner region and said outer core region have the refractive indices and outer radii such that fiber has
  (i) $80 \ \mu m^2 < Aeff_{1550} < 200 \ \mu m^2$; and
  (ii) $60 \ \mu m^2 < Aeff_{1450} < 180 \ \mu m^2$, and $Aeff_{1450} < Aeff_{1550}$; and
  (iii) for all wavelengths $\lambda s'$ and $\lambda p'$ where $80 \text{ nm} < (\lambda s' - \lambda p') < 110 \text{ nm}$, and where $\lambda s'$ is situated in the 1525 nm to 1610 nm wavelength range and $\lambda p'$ is situated in the 1420 nm to 1510 nm range, and
    the effective areas $Aeff,s'$ of $LP_{01}$ mode and at wavelengths $\lambda s'$ and the effective areas $Aeff,p'$ at the wavelengths $\lambda p'$ are such that $(Aeff,s' - Aeff,p')/Aeff,s' \geq 0.11$.

13. The optical fiber of claim 12 wherein. $Aeff,s' > Aeff,p'$ and wherein $0.3 \geq (Aeff,s' - Aeff,p')/Aeff,s' \geq 0.11$.

14. An optical fiber comprising
  (I) a Ge free silica based core comprising:
    (i) an inner core region with maximum refractive index delta of the core, $\Delta_0$ in % measured relative to pure $SiO_2$ such that $-0.02\% \leq \Delta_0 \leq 0.1\%$, and
    (ii) an outer core region with a minimum refractive index delta $\Delta_1$, where $-0.25 \leq \Delta_1 < -0.08$; such that the fiber has
      (a) an effective area $Aeff_{\lambda=1550}$ of $LP_{01}$ mode at a wavelength $\lambda=1550$ nm such that $80 \ \mu m^2 < Aeff_{\lambda=1550} < 250 \ \mu m^2$; and
      (b) an effective area $Aeff_{\lambda=1450}$ of $LP_{01}$ mode at a wavelength $\lambda=1450$ nm such that $65 \ \mu m^2 < Aeff_{\lambda=1450} < 225 \ \mu m^2$, wherein $Aeff_{\lambda=1550} > Aeff_{\lambda=1450}$, and $(Aeff_{\lambda=1550} - Aeff_{\lambda=1450})/Aeff_{\lambda=1550} \geq 0.1$; and
  (II) an annular cladding surrounding the core, the cladding including
    (i) a low index ring surrounding the core and having a minimum refractive index delta $\Delta_{RMIN}$, where (a) $\Delta_{RMIN} < \Delta_1$ and (b) $\Delta_{RMIN} \leq -0.3$ measured relative to pure $SiO_2$; and
    (ii) an outer cladding with a refractive index delta $\Delta_{Outer-Clad}$ relative to pure silica, such that $\Delta_{Outer-Clad} > \Delta_{R,MIN}$.

15. The optical fiber of claim 14, wherein $0.1 \leq (Aeff_{\lambda=1550} - Aeff_{\lambda=1450})/Aeff_{\lambda=1550} \leq 0.28$.

16. The optical fiber of claim 14, wherein $0.10 \leq (Aeff_{\lambda=1550} - Aeff_{\lambda=1450})/Aeff_{\lambda=1550} \leq 0.25$.

17. The optical fiber of claim 14, wherein $70 \ \mu m^2 < Aeff_{\lambda=1450} < 215 \ \mu m^2$.

18. The optical fiber of claim 14, wherein $\Delta_{RMIN} \leq -0.35$ and the absolute difference between the relative refractive index of the core $\Delta_0$ and the relative refractive index of the outer cladding $\Delta_{Outer-Clad}$ is: $|\Delta_0 - \Delta_{Outer-Clad}| > 0.05\%$.

19. An optical fiber comprising:
  (I) a Ge-free silica based core having a refractive index delta $\Delta_0$ and alpha value $(\alpha) \geq 5$, the core comprising:
    (i) an inner core region with maximum refractive index delta of the core, $\Delta_0$ in % measured relative to pure $SiO_2$ such that $-0.02\% \leq \Delta_0 \leq 0.1\%$, and
    (ii) an outer core region with a minimum refractive index delta $\Delta_1$, where $-0.25 \leq \Delta_1 < -0.08$; such that the fiber has
      (a) an effective area $Aeff,s$ of $LP_{01}$ mode such that for a wavelength $\lambda s$, $80 \ \mu m^2 < Aeff,s < 250 \ \mu m^2$ where the wavelength $\lambda s$ is $1610 \text{ nm} > \lambda s > 1525 \text{ nm}$, and
      (b) an effective area $Aeff,p$ of $LP_{01}$ mode such that at a wavelength $\lambda p$ $65 \ \mu m^2 < Aeff,p < 225 \ \mu m^2$, and the wavelength $\lambda p$ is $1510 \text{ nm} > \lambda p > 1420 \text{ nm}$, and $50 \text{ nm} \leq \lambda s - \lambda p \leq 125 \text{ nm}$; and
      (c) $(Aeff,s - Aeff,p)/Aeff,s$ is at least 0.12; and
  (II) an annular cladding surrounding the core, the cladding including: (i) a low index ring surrounding the core and having a minimum refractive index delta $\Delta_{RMIN} < \Delta_1$, and $\Delta_{R,MIN} \leq -0.30$ measured relative to pure $SiO_2$, and (iii) an outer cladding with a refractive index delta $\Delta_{Outer-Clad}$ relative to pure silica, such that $\Delta_{Outer-Clad} > \Delta_{R,MIN}$.

20. The optical fiber according to claim 19, wherein the core is structured such that $0.13 \leq (Aeff,s - Aeff,p)/Aeff,s \leq 0.3$.

21. The optical fiber of claim 19, wherein $80 \ \mu m^2 < Aeff,s < 200 \ \mu m^2$.

22. The optical fiber of claim 19, wherein $80 \ \mu m^2 < Aeff,s < 170 \ \mu m^2$, and $65 \ \mu m^2 < Aeff,p < 160 \ \mu m^2$.

23. The optical fiber of claim 19, wherein said core is Ge-free core and has core alpha value $(\alpha)$ is at least 5, $-0.25 \leq \Delta_1 < -0.08$; $\Delta_{RMIN} < \Delta_0$ and $\Delta_{RMIN} \leq -0.35$, relative to pure $SiO_2$; and $|\Delta_0 - \Delta_{Outer-Clad}| > 0.05\%$.

24. The optical fiber of claim 19, wherein said core is Ge-free core; $80 \ \mu m^2 < Aeff,s < 160 \ \mu m^2$; $0.13 < (Aeff,s - Aeff,p)/Aeff,s \leq 0.30$; $50 \text{ nm} < \lambda s - \lambda p < 125 \text{ nm}$; $\Delta_{RMIN} < \Delta_1$ and $\Delta_{RMIN} < -0.35$ measured relative to pure $SiO_2$, and $(|\Delta_{Outer-Clad}| > 0.05\%$.

25. The optical fiber of claim 1 wherein said inner region and said outer core region have the refractive indices and outer radii such that fiber has
  (i) an effective area $Aeff,s$ of $LP_{01}$ mode such that at a wavelength $\lambda s$, $80 \ \mu m^2 < Aeff,s < 160 \ \mu m^2$ where $1565 \text{ nm} > \lambda s > 1525 \text{ nm}$; and
  (ii) an effective area $Aeff,p$ of $LP_{01}$ mode such that at a wavelength $\lambda p$, $75 \ \mu m^2 < Aeff,p < 140 \ \mu m^2$ and $50 \text{ nm} < (\lambda s - \lambda p) < 125 \text{ nm}$; and
  (iii) $Aeff,s > Aeff,p$; and $(Aeff,s - Aeff,p)/Aeff,s \geq 0.13$.

* * * * *

UNITED STATES PATENT AND TRADEMARK OFFICE
CERTIFICATE OF CORRECTION

PATENT NO. : 10,175,420 B2  Page 1 of 1
APPLICATION NO. : 15/355790
DATED : January 8, 2019
INVENTOR(S) : William Allen Wood It is certified that error appears in the above-identified patent and that said Letters Patent is hereby corrected as shown below:

On the Title Page

In Column 2, item (57), Abstract, Line 11, delete "Aeff, $_{\lambda=1475,}$" and insert -- Aeff$_{\lambda=1475,}$ --, therefor.

In Column 2, item (57), Abstract, Line 11, delete "Aeff, $_{\lambda=1475}$" and insert -- Aeff$_{\lambda=1475}$ --, therefor.

In Column 2, item (57), Abstract, Line 15, delete "$\Delta_{R,MIN} \geq \Delta_1$;" and insert -- $\Delta_{R,MIN} < \Delta_1$; --, therefor.

In the Claims

In Column 20, Line 42, Claim 1, delete "Aeff$_{\lambda-1525}$>0.07;" and insert -- Aeff$_{\lambda=1525}\geq$0.07; --, therefor.

In Column 20, Line 54, Claim 3, delete "Ge free," and insert -- Ge-free, --, therefor.

In Column 21, Line 12, Claim 11, delete "μm$_2$," and insert -- μm$^2$, --, therefor.

In Column 21, Line 31, Claim 13, delete "wherein." and insert -- wherein --, therefor.

In Column 21, Line 35, Claim 14, delete "Ge free," and insert -- Ge-free, --, therefor.

In Column 22, Line 23, Claim 19, after "λp" insert -- , --, therefor.

In Column 22, Line 32, Claim 19, delete "SiO$_2$," and insert -- SiO$_2$; --, therefor.

In Column 22, Line 48, Claim 24, delete "$\Delta_{RMIN}$<-0.35" and insert -- $\Delta_{RMIN}\leq$-0.35 --, therefor.

In Column 22, Line 48, Claim 24, delete "SiO$_2$," and insert -- SiO$_2$; --, therefor.

In Column 22, Line 49, Claim 24, delete "(|$\Delta_{Outer-Clad}$|" and insert -- |$\Delta_0$-$\Delta_{Outer-Clad}$| --, therefor.

Signed and Sealed this
Tenth Day of September, 2019

Andrei Iancu
*Director of the United States Patent and Trademark Office*